United States Patent [19]

Councilman

[11] Patent Number: 4,549,702
[45] Date of Patent: Oct. 29, 1985

[54] DRAG FOR SPINNING REEL

[75] Inventor: Richard R. Councilman, Collinsville, Okla.

[73] Assignee: Brunswick Corporation, Skokie, Ill.

[21] Appl. No.: 645,529

[22] Filed: Aug. 29, 1984

Related U.S. Application Data

[63] Continuation of Ser. No. 400,966, Jul. 22, 1982, abandoned.

[51] Int. Cl.[4] ............................................. A01K 89/01
[52] U.S. Cl. ..................... 242/84.51 A; 242/84.5 A
[58] Field of Search ................ 242/84.51 A, 84.51 R, 242/84.5 A, 84.5 R

[56] References Cited

U.S. PATENT DOCUMENTS

| | | | |
|---|---|---|---|
| 2,344,209 | 3/1944 | Lowe | 242/84.51 R |
| 2,558,896 | 7/1951 | Young et al. | |
| 2,690,309 | 9/1954 | Cuonz et al. | |
| 2,705,113 | 3/1955 | Bonanno | |
| 2,858,998 | 11/1958 | Nadolskey | 242/84.5 R |
| 2,863,617 | 12/1958 | Chapin et al. | |
| 2,925,229 | 2/1960 | Wood | 242/84.5 R |
| 3,027,113 | 3/1962 | Berger et al. | |
| 3,144,217 | 8/1964 | Wood, Jr. | |
| 3,946,963 | 3/1976 | Oberg | 242/84.21 R |
| 4,153,219 | 5/1979 | Kamikawa | 242/84.51 R |
| 4,173,317 | 11/1979 | Hamayasu et al. | 242/84.51 A |
| 4,368,857 | 1/1983 | Jacob et al. | 242/84.5 A |

OTHER PUBLICATIONS

Brochure Entitled "Champion Spinning Reels" by Quick Corporation, pp. 1, 6, 27, 30 and 31.

*Primary Examiner*—Stuart S. Levy
*Assistant Examiner*—Thomas R. Hannon
*Attorney, Agent, or Firm*—Wood, Dalton, Phillips, Mason & Rowe

[57] ABSTRACT

Skirted style and conventional style spinning reels are provided with a positive drag applying mechanism that operates directly on both sides of the line spool. The drag mechanism includes friction means acting on one axial surface of the spool and a second friction means acting on the other axial surface of the spool to apply uniform and effective drag to the spool. A unique clicker member is included that audibly indicates that the drag force is exceeded.

12 Claims, 8 Drawing Figures

DRAG FOR SPINNING REEL

This application is a continuation of application Ser. No. 400,966, filed July 22, 1982, now abandoned.

BACKGROUND OF THE INVENTION

1. Field of the Invention

This invention relates to skirted style and conventional style spinning reels and more particularly to a spool mounted drag system for a spinning reel.

2. Background of the Prior Art

It is well known in the prior art to utilize a drag mechanism mounted either in the hub of the spool, in the rear of the body of the reel or in contact with the front surface of the spool. The most common drag mechanism is mounted in the hub of the spool wherein the drag friction elements in the hub are limited by the diameter and length of the hub so that the resulting drag mechanism is limited in performance even with ideally selected materials and component configuration. The rear mounted drag mechanisms are mounted in the body of the reel at the end of the reel opposite to the spool. The normal cosmetics and reel size provides restrictive boundries that limits the drag performance especially in drag adjustment range and sensitivity. The third common form of drag mechanism is where a large disc of friction material is in contact with the front surface of the spool. Once again, space restrictions (due to aesthetics) limits the friction element to a single member which is retained by the drag adjustment knob. All three forms of drag mechanisms provide for rotation of a threaded element to increase or decrease pressure loading on the friction surfaces to change the drag resistance to rotation.

SUMMARY OF THE INVENTION

The present invention is for use on skirted style and conventional style spinning reels and overcomes the problems of the prior art by combining the advantageous features of a hub drag system and a large diameter front mounted drag system. The spool has a first drag system in a recessed portion of the spool and a second drag system between the spool and a flange on the arbor for the spool. A drag adjusting member applies force between the spool and the two drag systems to provide a better, more positive drag force on the spool with increased sensitivity to fine adjustments as well as more rapid application of the drag adjustment when needed.

GENERAL DESCRIPTION OF A SPINNING STYLE FISHING REEL

Figure 1:
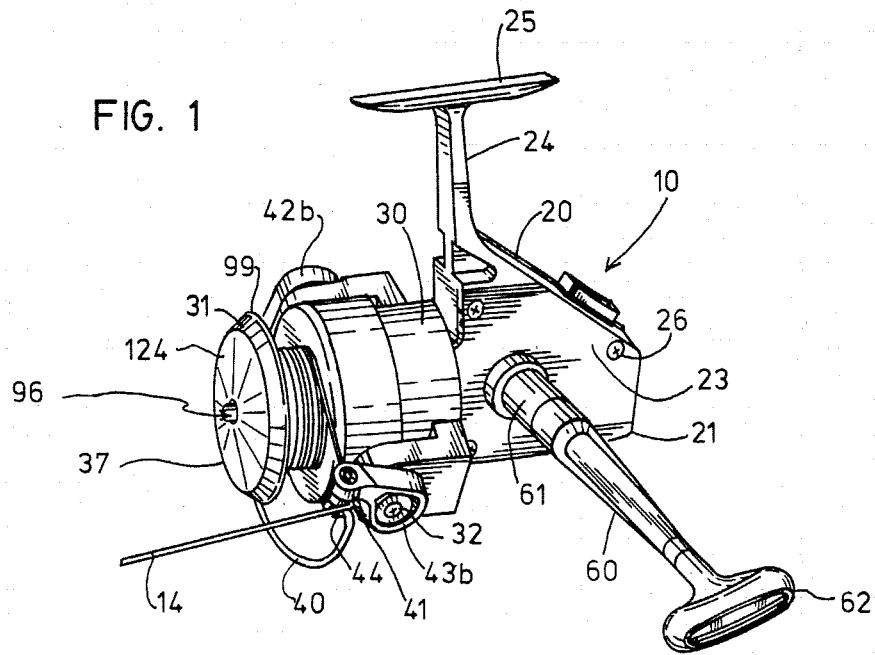
FIG. 1 is a perspective view of a skirted style spinning reel incorporating the invention therein.
Figure 2:
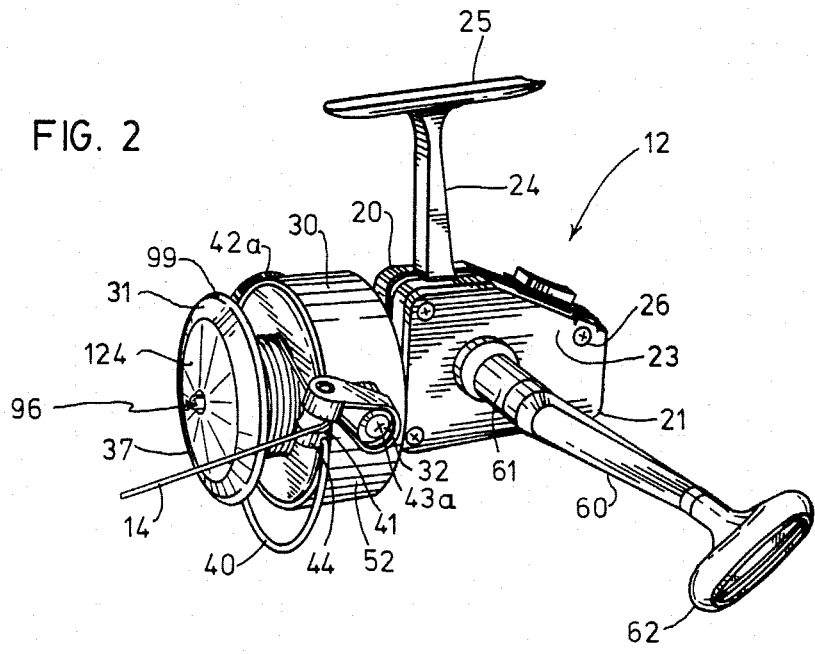
FIG. 2 is a perspective view of a conventional style spinning reel likewise incorporating the invention therein.

In FIG. 1, a skirted style open-face fishing reel 10 is shown and in FIG. 2, a conventional style open-face fishing reel 12 is shown. Both styles of reels function similarly, the only exception being the arrangement of the spool. As used hereinafter, the same numerals will designate the common parts for both reels; for special parts on the reels different numerical designations will be used. The reel 10 or 12 having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. The handle 62 may be disposed on the other side of the gear case 23 for accommodating the personal desires of the user.

An axially mounted rotor housing 30 is provided and is adapted to rotate about the axis of the spool 31 as the crank 60 is turned for line retrieval, with the line 14 being captured by the bail 40 passing over the line guide assembly 41 as shown. Bail 40 and line guide assembly 41 rotate with rotor 30 so that the line 14 is thereby wound on the spool 31. The shank of the screws 32 function as rotary pivot bearing points and are accordingly the centers of rotation for the bail 40 via the bail arms 42a, 42b and 43a, 43b. An internal mechanism causes the line spool 31 to reciprocate axially back and forth as the rotor 30 winds the line 14 about the spool 31; but as in spinning reels generally, the spool 31 does not rotate about its central core axis, except as controllably permitted by the adjustable free-floating drag mechanism 50, as will be described hereinafter. Such permitted rotation of the spool may occur during line retrieval when a fish is on the other end of the line 14 fighting for its life while still in the water; and, thus the force of the drag friction is overcome by tension in the line. When the bail 40 is swung to an open position for casting, the line 14 may freely pay out from the spool 31 over lip 99. In FIGS. 1 and 2, the bail 40 is shown in the "closed", "retrieve" or "rewind" position. The line guide roller 44 is preferably rotatable, that is, it is preferably a miniature pulley to reduce the sliding friction which might otherwise cause line wear.

In paying out the line 14 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

DESCRIPTION OF THE PREFERRED EMBODIMENT

Figure 3:
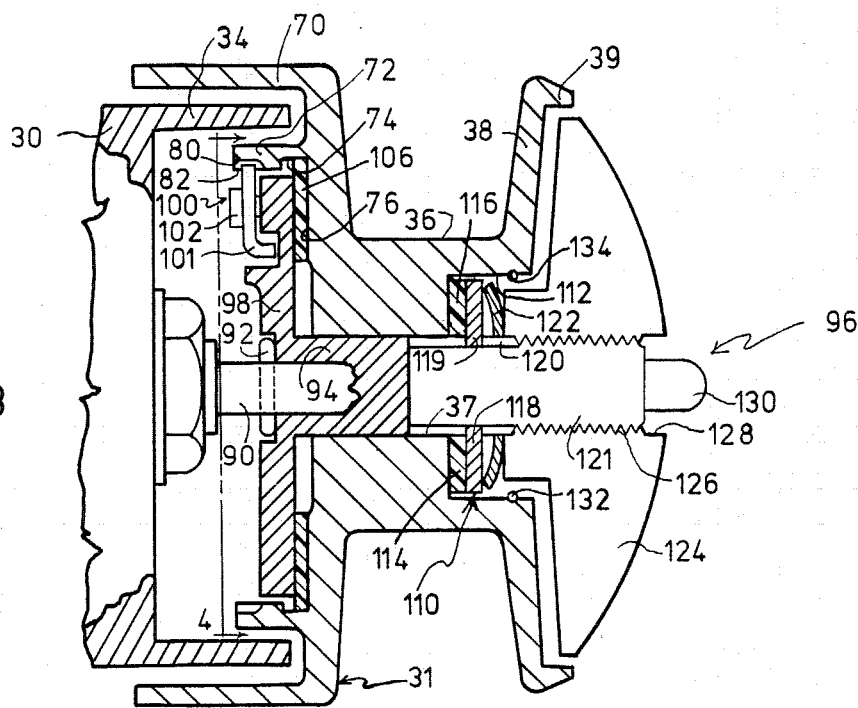
FIG. 3 is a vertical sectional view through the front spool portion of the spinning reel of FIG. 1.
Figure 4:
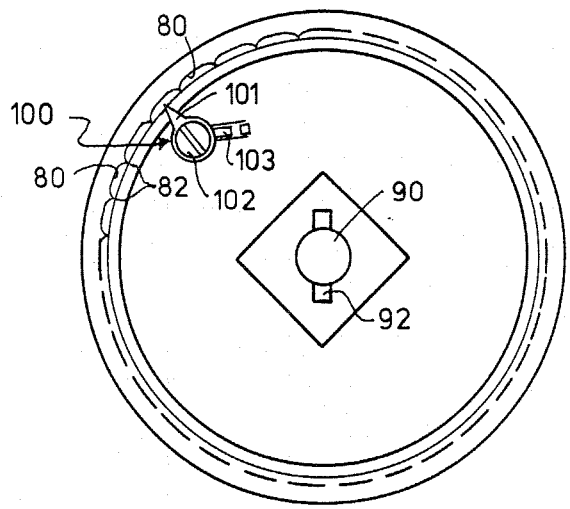
FIG. 4 is a view taken along the line 2—2 of FIG. 3.

Referring to FIGS. 3 through 8, and in particular initially FIGS. 3 and 4, a drag applying and adjusting apparatus for a skirted style open face fishing reel is disclosed. The skirted style line spool 31 has an axially projecting skirt 70 which when the spool 31 is assembled on the arbor 94 of the reel, overlaps the forwardly extending sleeve 34 of the rotor housing 30. The spool 31 has a line storage pocket 36 for storing the fishing line between casts. The pocket has a radially projecting front wall 38 with a forwardly extending lip 39. The spool 31 has an aperture 37 extending through the center thereof which aperture is of a diameter to fit over arbor 94 of the reel. Concentrically disposed within the skirt 70 of the spool is a ring boss 72 which is spaced from the skirt 70 and is positioned on the inside of the sleeve 34 of the rotor housing 30. The ring boss 72 may be integrally formed with the spool 31 or may be rigidly attached thereto by any appropriate method. The ring boss 72 has an undercut 74 commencing adjacent a rearwardly extending planar face 76 of the spool 31. The internal surface 80 of the ring boss 72 has a plurality of equally spaced apart, inwardly projecting teeth 82 which, as will be described hereinafter, function as click gear teeth.

The center shaft 90 as is conventional in open faced spinning reels does not rotate relative to the housing 20 but is provided with an apparatus for oscillating or reciprocating the center shaft back and forth axially relative to the housing 20 as the rotor housing 30 is rotated about the center shaft by the crank assembly 60. A drive pin 92 extends transversely through the center shaft 90 with the ends projecting radially outward from the surface of the center shaft. The arbor 94 encircles the end of the center shaft 90 and is keyed to the center shaft in the conventional fashion so that the push button release apparatus 96 can cooperate with the arbor 94 for quick release and attachment of the spool 31 to the housing 20. The push button release apparatus 96 is conventional and well known in the art.

A large diameter flange 98 is integrally formed with the arbor 94 and extends radially outward in somewhat overlapping relationship to the pin 92 of the center shaft 90. Although the flange 98 is shown integral with the arbor 94, it is to be understood that the flange 98 could be removably secured to the arbor 94 so that when in place it will function as an integral part thereof. The flange 98 has an axially facing portion which overlaps a substantial portion of the planar face 76 of the spool and has on the opposite facing side of the flange a clicker mechanism 100 comprising a clicker arm 101 which is pivotally secured to the flange 98 by a screw member 102 or the like. A spring arrangement 103 is provided between the flange 98 and the clicker arm 101 so as to hold the clicker arm in a central position with the point of the clicker arm 101 projecting radially outward from the flange 98. The point overlaps the teeth 82 on the ring boss 72 so that relative movement between the spool 31 and the flange 98 on the arbor will cause a clicking sound, indicating that the spool 31 is being rotated relative to the center shaft 90. A first drag applying apparatus 105 is provided and includes a drag washer or friction member 104 located adjacent to and in face-to-face contact with the planar surface 76 of the spool 31. The drag washer has a planar surface overlapping with and in face-to-face contact with the axially facing portion of the flange 98. A circumferential edge 106 of the drag washer 104 nests in the undercut 74 of the ring boss 72 so as to prevent removal or accidental loss of the drag washer 104 when the spool 31 is removed from the arbor 94.

A second drag applying apparatus 110 is mounted in a recess or cavity 112 in the spool 31, which cavity 112 extends axially inward from the front face of the spool. A drag washer or friction member 114 is seated in the recess 112 and bears against the offset axial face 116 of the spool. The material of the drag washer 114 is suitable to obtain the desired coefficient of friction with the axial face 116. Another drag washer 118, which preferably is made of metal, has protrusions 119 which nest in splines or flats 120 in the shank 121 of the push button release apparatus 96. The shank 121 is the same diameter as the arbor 94 and abuts with and is locked to the arbor 94 when the apparatus 96 is engaged. The drag washer 118 will not rotate relative to the shank 121 and arbor 94 but the splines or flats 120 on the arbor will permit the drag washer 118 to be moved axially of the arbor. A cup-shaped spring washer 122 is secured around the shank 21 and has one portion thereof bearing against the drag washer 118 with another portion thereof bearing against the inner surface of a drag adjusting knob 124. The drag adjusting knob 124 is threaded by threads 126 on to the arbor 90 and has a central opening 128 through which the push button 130 of the push button release 96 projects. A lock ring 132 nests in a groove 134 formed around the inner surface of the recess 112 so as to prevent the drag member 110 from becoming separated from the spool in the event the drag adjusting knob 124 is threaded off the shank 121.

The skirted style spool 31 with the drag adjusting knob 124 may be removed from the reel housing 20 by depressing the push button 130 to release the connection between the shank 121 and the arbor 94.

With the spool 31 assembled with the housing 30, the drag setting for the spool can be adjusted by rotating the drag adjusting knob 124 clockwise or counterclockwise to vary the drag between the drag washer 104, the flange 98 and the one axial face 76 of the spool 31 and between the drag washer 114, the non-rotatable drag washer 118, and the other axial face 116 of the spool. During retrieval of the line 14 onto the spool 31 excessive pull on the line such as when a fish is caught that is extra heavy or is fighting the hook, will torque the spool relative to the arbor. If the force of the pull exceeds the drag setting, the spool will rotate relative to the arbor, which rotation will be relayed to the fisherman in the form of clicking sounds caused by the clicker arm 101 snapping over the teeth 82 as the ring boss 72 on the spool is moved relative to the nonrotatable flange 98 on the arbor 94. The flange 98 on the arbor and the drag washer 118 keyed to the shank 121 are fixed relative to the housing 20 so that the drag washers 104 and 114 bear against opposite faces of the spool to resist rotation of the spool. The combined drag forces provided by both the drag washer 114 on the one face and by the other drag washer 104 on the other face of the spool is positive and effective so that the drag settings can be accurately adjusted as desired.

Figure 5:
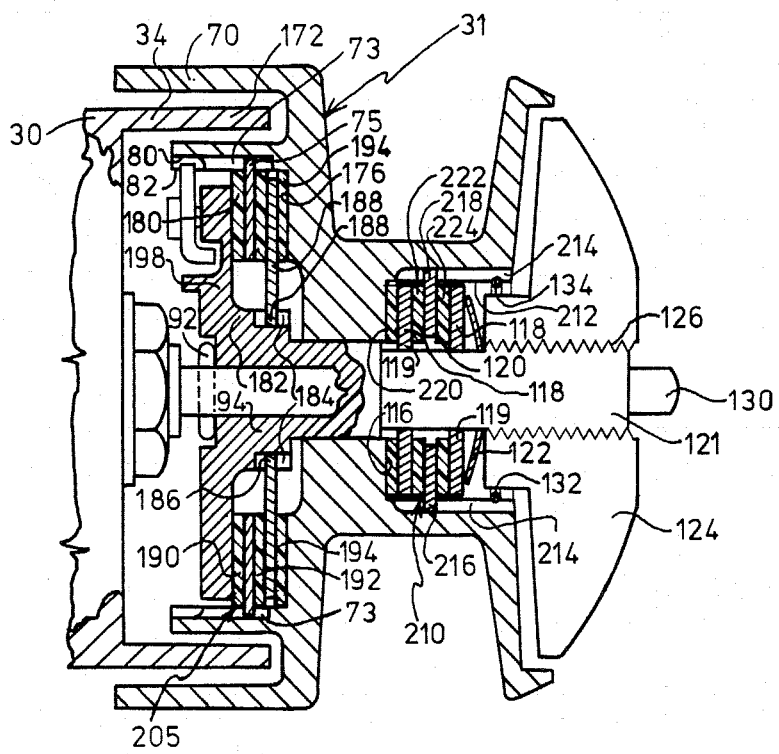
FIG. 5 is a vertical sectional view similar to FIG. 3 only showing a modified form of the invention.

Referring to FIG. 5, a modified drag adjusting apparatus is provided and has many common elements that are the same and bear the same reference numerals as in FIGS. 3 and 4. A first drag applying apparatus 205 is provided on the rear of the spool 31 whereby the spool 31 has an enlarged ring boss 172 which has two or more longitudinal splines or slots 73 formed on the internal surface 80 thereof. The splines or slots 73 extend beyond the axially projecting teeth 82 and receive projecting lugs or tabs 75 extending radially outward from drag washer 180. The flange 198 on the arbor 94 has a step or shoulder 182 which has two or more longitudinally disposed splines or slots 184 which receive lugs or tabs 186 extending radially inward from drag washer 188. Three drag washers 190,192,194 are interposed, respectively, between the axial face of the flange 198 and the drag washer 180, between the drag washer 180 and the drag washer 188 and between the drag washer 188 and the axial face surface 176 of the spool 31. The flange 198 has the clicker mechanism 100 with the point on the clicker arm 101 in position to engage the teeth 82 on the ring boss 172 during relative movement between the spool 31 and the arbor.

A second drag applying apparatus 210 is provided in a forwardly facing recess 212 formed in the front surface of the spool. The recess 212 has two or more longitudinally extending splines or slots 214 formed in the wall of the recess which splines receive lugs or tabs 216 extending radially outward from drag washer 218. Two drag washers 118 are provided with each one having protrusions 119 which are received in the splines or flats 120 of the shank 121 of the push button release apparatus 96. Three drag washers 220,222,224 are provided and are interposed, respectively, between the axial end face 116 of the spool and the one drag washer 118, between the drag washer 118 and the drag washer 218, and between the drag washer 218 and the second drag washer 118. A cup shaped spring washer 122 is positioned around the shank 121 and bears against drag washer 118 and against the inner surface of the drag adjusting knob 124. The drag adjusting knob 124 is threaded at 126 on the shank 121 so that rotation of the knob 124 relative to the housing 20 will advance or retract the knob relative to the flange 198 on the arbor 94 to increase or decrease the drag on the spool. Snap ring 132 nests in groove 134 in recess 212 to retain the second drag apparatus in the recess. The non-rotating flange 198, drag washer 180, and two drag washers 118 acting through the drag washers 190,192,194 and 220,222,224 provide the resistance to rotation of the spool 31 acting through the drag washer 180, face surface 176, face surface 116 and drag washer 216.

Figure 6:
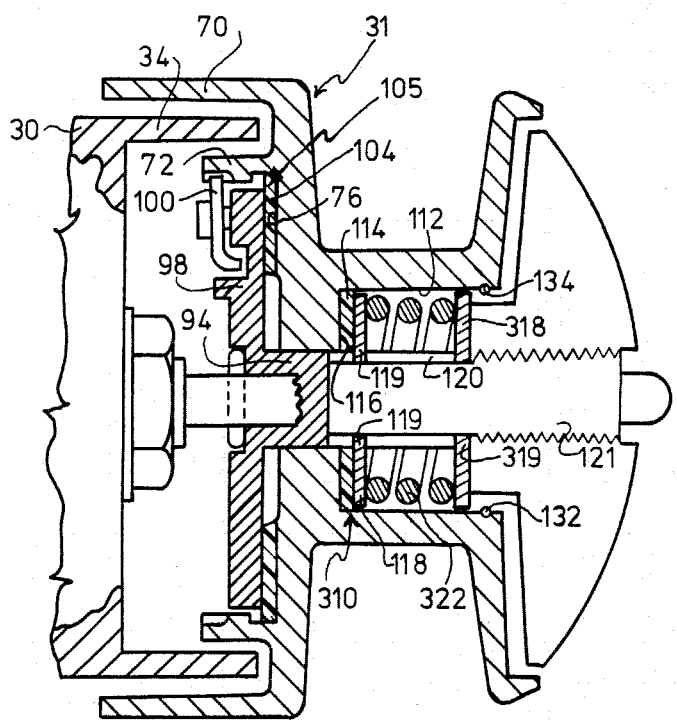
FIG. 6 is a vertical sectional view similar to FIG. 3 only showing another modified form of the invention.

FIG. 6 is another modified version of the drag adjusting apparatus and has many elements common to the FIGS. 3 and 4 version including the spool 31, the ring boss 72, the arbor 94, the flange 98 with the clicker 100 and the first drag applying apparatus 105 with drag washer 104 bearing between face surface 76 of the spool and the flange 98. The second drag applying apparatus 310 includes the drag washer 114 bearing against face surface 116 of the recess 112 of the spool with the drag washer 118 having protrusions 119 engaging in splines or flats 120 on the shank 121. A coil spring 322 encircles the shank 121 and bears against drag washer 118 and a second similar drag washer 318. Drag washer 318 has protrusions 319 engaging in splines or flats 120 on the shank 121. The second drag applying apparatus 310 is retained in the recess 112 by snap ring 132 seating in groove 134 in the wall of the recess. The drag adjusting knob 124 is threaded on the shank 121 and bears against drag washer 318 so that turning the drag adjusting knob will vary the drag on the spool. The spring 322 provides the resilient force from the knob 124. The drag washers hold the ends of the spring so that the spring will not be twisted as it is loaded or unloaded by movement of knob 124.

Figure 7:
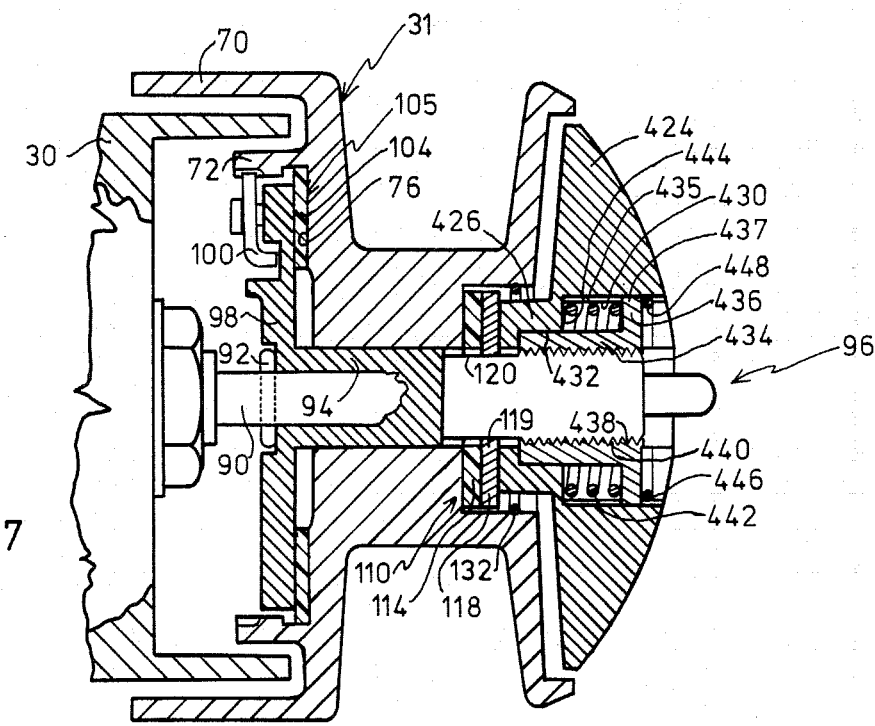
FIG. 7 is a vertical sectional view similar to FIG. 3 only showing still a further modified form of the invention.

FIG. 7 is a further modified form of the invention wherein all of the elements of FIGS. 3 and 4 are adopted with the exception that the spring washer 122 and the drag adjusting knob 124 are eliminated and in lieu thereof a drag adjusting knob 424 is provided and has a forwardly projecting cylindrical portion 426 which bears directly against the drag washer 118. The knob 424 has a recess 428 which has two different diameter portions 430,432. The smaller diameter portion 432 slidably receives the forward end of a sleeve 434 having a collar 436 at the end remote from the forward end. The large diameter portion 430 has splines or flats 435 extending parallel to the axis of the centershaft 90. The collar 436 has protrusions 437 seating in the splines or flats 435. The collar 436 is threaded at 438 and mates with threads 440 on the shank 121 of the push button release apparatus 96. A spring 442 nests in the large diameter portion 430 of the knob and bears against the shoulder 444 between portions 430 and 432 and the collar 436. Snap ring 446 is seated in groove 448 in the wall of the recess to prevent the sleeve 434 and associated parts from separating from the knob 424. Turning the knob will advance or retract the sleeve 436 and knob 424 to increase or decrease the drag applied to the spool 31 by the compressive forces of the spring acting through the cylindrical portion 426 of the knob.

Figure 8:
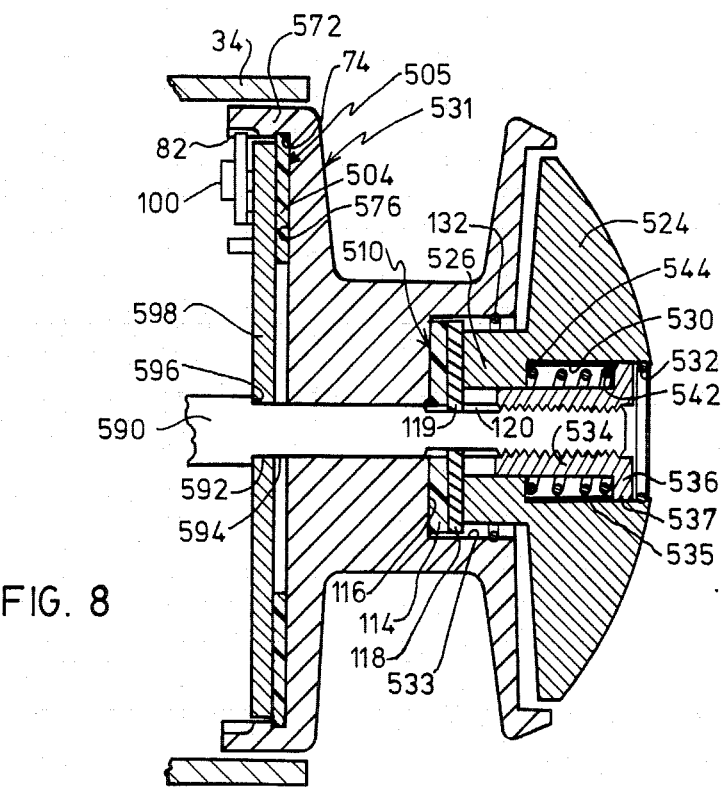
FIG. 8 is a vertical sectional view through the front spool portion of FIG. 2 showing yet another modified form of the invention.

FIG. 8 shows a modified form of the invention used with a conventional spool 531 wherein no skirt is provided. The spool 531 has a ring boss 572 integrally formed therewith (as stated above the ring boss 572 could be a separate item attached to the spool). The ring boss 572 is encompassed within the sleeve 34 of the rotating rotor housing 30. The first drag applying apparatus 505 is provided by a drag washer 598 which is keyed to the center shaft 590 by protrusions 592 engaging flats or splines 594 on the center shaft. The drag washer 598 bears against a stop 596 on the center shaft. A clicker apparatus 100 is carried by the drag washer 598 and engages with the teeth 82 on the ring boss 572. A drag washer 504 is seated between the end face 576 of the spool and the axial face of the drag washer 598. The drag washer 504 seats around its periphery in an undercut 74 as described with respect to FIG. 3.

The second drag applying apparatus 510 has drag washer 114 bearing against axial face 116 with drag washer 118 keyed by protrusions 119 to the splines or flats 120 in the center shaft. The drag adjusting knob 524 has a recess 530 which terminates in a shoulder 544. Splines or flats 535 are formed in the recess 530 in the knob. A sleeve 534 is threaded to the center shaft and has a forward end slidable in a pilot hole 533 in the knob and has a collar 536 extending radially into the recess 530. Protrusions 537 on the collar 536 nest with the flats or splines 535 in the recess so that the knob and sleeve rotate together as the sleeve 534 is permitted to slide axially relative to the knob. A spring 542 nests between the shoulder 544 and the collar 536 to urge the two apart axially. The knob 524 has a cylindrical portion 526 bearing against the drag washer 118. Snap ring 532 seats in groove 534 in the recess 530 to retain the sleeve 534 and spring 542 in the recess. Turning the drag adjusting knob 524 will advance or retract the knob relative to the drag washer 598 to increase or decrease the drag on the spool.

From the above it is clear that an improved drag adjusting mechanism is provided for use on skirted style and conventional style spinning reels. The drag adjusting mechanism comprises two drag adjusting apparatuses one of which provides drag to a large diameter face portion of the spool and the other of which provides drag to a smaller diameter opposite face portion of the spool. The result is an accurate, positive and effective drag adjusting mechanism which incorporates a clicker assembly that indicates when the drag setting is being exceeded by the pull on the line.

I claim:

1. In a fishing reel having a housing, an axially reciprocable, non-rotatable center shaft carried by the housing, a line spool carried by the center shaft and having a line storage pocket on which the line is wound, which spool during casting is non-rotating and from which fishing line is unwound in a substantially axial direction, by transmission means to the hand crank to be rotated thereby and bail means pivotally mounted on the support member to rotated therewith, the improvement comprising:

means for applying drag to the line spool comprising first drag means, second drag means radially offset and axially separated from the first drag means, and drag adjusting knob means, the first drag means being planar and having inner and outer diameters, the outer diameter extending radially outward of the storage pocket, the first drag means being mounted on one side of the line spool between one planar axial face of the line spool extending radially outward of the storage pocket and a flange member carried by the center shaft, the second drag means having an outer diameter smaller than the inner diameter of the first drag means and being mounted on the other side of the line spool between a second axial face of the line spool disposed radially inward of the storage pocket and the drag adjusting knob means, the knob means being carried by the center shaft and being axially adjustable along the center shaft for increasing and decreasing the drag applied by the first and second drag means to the line spool.

2. A fishing reel as claimed in claim 1 wherein the first drag means comprises a drag washer positioned between a contact surface of the flange member and the axial face of the line spool, the drag washer having an outer diameter greater than the diamter of the line storage pocket.

3. A fishing reel as claimed in claims 1 or 2 wherein the second drag means comprises a second drag washer positioned adjacent a second axial face of the line spool, a third drag washer keyed to the center shaft and bearing against said second drag washer, and spring means positioned between the third drag washer and the knob means whereby adjusting the knob means increases or decreases the drag on the spool.

4. A fishing reel as claimed in claims 1 or 2 wherein the knob means is threaded to the center shaft whereby rotating the knob means relative to the center shaft increases or decreases the drag on the spool.

5. A fishing reel as claimed in claim 1 wherein the spool has a rearwardly extending ring boss overlapping the first drag means, clicker means carried by the flange member and overlapping means on the ring boss whereby movement of the spool relative to the center shaft will produce an audible clicking sound.

6. A fishing reel as claimed in claim 1 wherein the first drag means comprises at least one drag washer keyed to the center shaft, at least one drag washer keyed to the spool and plural drag washers positioned between the flange member, the drag washer keyed to the center shaft, the drag washer keyed to the spool and the axial face of the spool, all of the drag washers having an outer diameter greater than the diameter of the line storage pocket.

7. A fishing reel as claimed in claims 1 or 6 wherein the second drag means comprises at least one drag washer keyed to the center shaft, a drag washer keyed to the drag knob and plural drag washers positioned between the second axial face of the spool, the drag washer keyed to the center shaft, and the drag washer keyed to the drag knob, resilient means bearing against the end most drag washer, and the drag knob adjustable along the center shaft to compress or expand the resilient means for increasing or decreasing the drag on the spool.

8. A fishing reel as claimed in claim 1 wherein a clicker means is carried by the flange member and overlaps means on the spool whereby an audible signal is given when the spool is moved relative to the center shaft.

9. A fishing reel as claimed in claim 1 wherein resilient means are provided for resiliently urging the first and second drag means against the spool.

10. A fishing reel as claimed in claim 9 wherein the resilient means is between the second drag means and the knob means.

11. A fishing reel as claimed in claim 9 wherein the resilient means is between two portions of the knob means.

12. A fishing reel as claimed in claims 10 or 11 wherein the resilient means is a disc-shaped spring member.

* * * * *